July 13, 1926. 1,592,626
T. DELMASTRO
SPOTLIGHT ADJUSTING MECHANISM
Filed Feb. 9, 1926  2 Sheets-Sheet 1

Thomas Delmastro, INVENTOR.

BY Geo. F. Kimmel ATTORNEY.

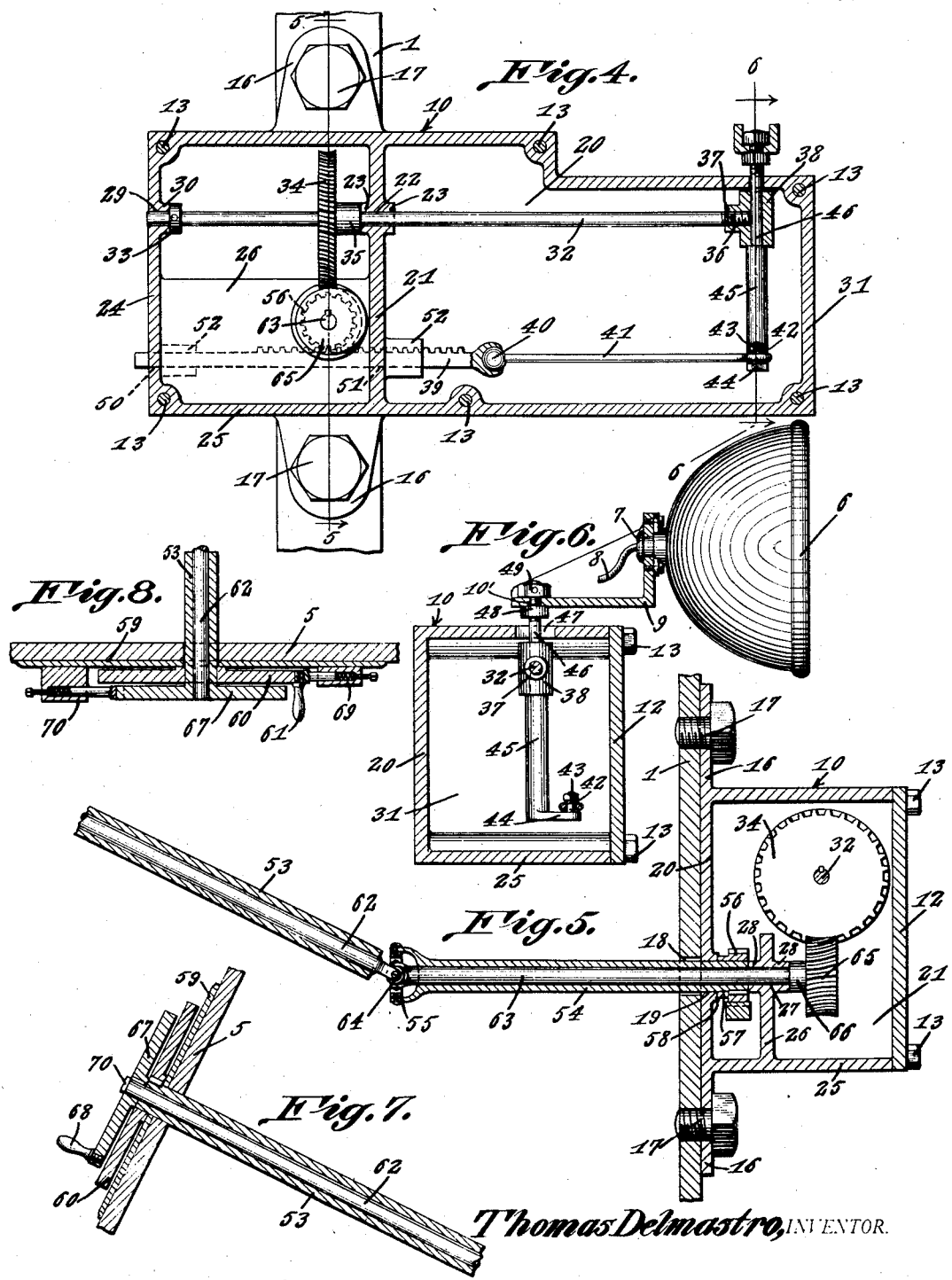

Patented July 13, 1926.

UNITED STATES PATENT OFFICE.

THOMAS DELMASTRO, OF BRACEVILLE, ILLINOIS.

SPOTLIGHT-ADJUSTING MECHANISM.

Application filed February 9, 1926. Serial No. 87,154.

This invention relates to a spot light adjusting mechanism for use in connection with motor vehicles, and has for its object to provide, in a manner as hereinafter set forth, a mechanism of such class, for shifting the spot light on a vertical and a horizontal axis to provide for the light rays to be projected sidewise and downwardly or upwardly with respect to the vehicle during the travel thereof.

A further object of the invention is to provide, in a manner as hereinafter set forth, a spot light adjusting mechanism for connection with a spot light arranged upon the forward end of the vehicle and with the mechanism operated from the interior of the vehicle for the purpose of adjusting the spot light to the desired position, and further with the mechanism including means for detachably maintaining the spot light in the position to which it has been adjusted.

Further objects of the invention are to provide a spot light adjusting mechanism, in a manner as hereinafter set forth, which is comparatively simple in its construction and arrangement, strong, durable, compact, thoroughly efficient in its use, conveniently operated, and readily installed with respect to a motor vehicle.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a perspective view of a motor vehicle showing the adaptation therewith of a spot light adjusting mechanism, in accordance with this invention.

Figure 2 is an elevation of a spot light adjusting mechanism, in accordance with this invention, showing the position thereof with respect to the instrument board and radiator of a motor vehicle.

Figure 3 is an elevation illustrating the actuating disks for the shafts of the mechanism and the frictional latching means for the disks.

Figure 4 is a longitudinal sectional view illustrating the adjusting mechanisms for the spot light.

Figure 5 is a section on line 5—5, Figure 4.

Figure 6 is a section on line 6—6, Figure 4.

Figure 7 is a section on line 7—7, Figure 3.

Figure 8 is a section on line 8—8, Figure 3.

Referring to the drawings in detail, 1 denotes the frame of the radiator of a motor vehicle, 2 the vehicle body, 3 and 4 the right and left headlight respectively of the vehicle, and 5 the instrument board. Positioned below the left headlight 4 and arranged therebetween and the radiator frame 1 is a spot light 6 including a rearwardly extending lamp socket member 7 for the circuit wires 8. The socket member 7 is fixedly secured to a rearwardly extending bracket 9 which supports the spot light 6, and the latter bodily moves with the bracket 9, and said bracket 9 is provided at its rear end with an opening 10'.

Secured to the radiator frame 1, at the front thereof, at a point below the left headlight 4 and projecting towards the latter, is a housing or casing of substantial length and height and which includes a rectangular body portion 10 closed at its rear and having an open front. A closure plate 12 is detachably secured to the open front of the body portion 10 by the hold-fast device 13. The outer end portion 14 of the housing is of greater height than the inner end portion 15. The top, bottom and ends of the housing are closed. The back wall of the body portion 10 is provided with oppositely extending apertured ears 16 for the passage of hold-fast devices 17 to secure the housing 1 to one side of the radiator frame 1. That side of the radiator frame 1, to which the body portion 10 is secured, is formed with an opening 18, which registers with an opening 19 formed in the back wall 20 of the body portion 10. The ears 16 are positioned intermediate the ends of the higher part 15 of the housing, at the rear thereof.

Formed integral with the top and bottom of the body portion 10, at the high part of the housing, is a vertically disposed partition 21 formed near its top with an opening 22 and a pair of oppositely extending collars 23 registering with the opening 22. Formed integral with the end wall 24 of the body portion 10 and with the partition 21, as well as with the bottom 25 of the body portion 10, is a lengthwise extending partition 26, which is positioned rearwardly with respect to the longitudinal median of the body portion 10. The partition 26 is of materially less height than the height of the partition 21 and is formed near its top with an opening 27 and a pair of oppositely extending collars 28, which register with said opening.

The end wall 24 of the body portion 10, near the top thereof, is formed with an opening 29 and an inwardly arranged boss 30, journalled in the openings 22 and 29 and extending to a point in proximity to the end wall 31 of the body portion 10 is a shaft 32 provided with a collar 33, which abuts the boss 30 to arrest lengthwise shifting of the shaft 32 in one direction. Keyed to the shaft 32, at a point between the partition 21 and end wall 24, is a worm gear 34 having its hub 35 extended to abut against one of the collars 23, whereby the lengthwise shift of the shaft 32 is arrested in the opposite direction. That end of the shaft 32, which is arranged in proximity to the end wall 31, is peripherally threaded, as at 36, and is secured in a nipple 37 which is an integral part of a vertically disposed bearing 38 of sleeve-like form. The shaft 32, worm gear 34, and bearing 38 provide an adjusting device or mechanism employed for the purpose of adjusting the spot light 6 on a horizontal axis.

The adjusting device or mechanism for shifting or adjusting the spot light on a vertical axis comprises a rectangular bar 39, which has its inner end universally connected, as at 40, to a pull rod 41 which is loosely connected, as at 42, to a headed pin 43 extended upwardly from a crank arm 44, provided on the lower end of a vertically disposed adjusting shaft for the bracket 9. The upper portion of the shaft 45 is of reduced diameter, as indicated at 46, and said reduced portion extends upwardly through the bearing 38 and a slot 47 formed in the top of the body portion 10, and said reduced portion 46 further projects through the opening 10' formed in the bracket 9. The reduced portion 46 is provided with a collar 48, which abuts against the bracket 9, and the upper end of said reduced portion carries a clamping nut 49, which, in connection with the collar 48 clamps the bracket 9 to the shaft 45, so that when the latter is shifted the bracket 9 will be carried therewith, and under such conditions shifting the spot light 6 to the desired position. The rack bar 39 extends through an opening 50 formed in the end wall 24 of the housing and also extends through an opening 51 formed in the lower portion of the partition 21. Guides 52 are formed integral with the end wall 24 and partition 21 and through which extends the rack bar 39.

The adjusting device or mechanism for shifting or adjusting the spot light on a horizontal axis is termed an upper adjusting mechanism for the lamp, and the adjusting device or mechanism for adjusting or shifting the spot light on a vertical axis is termed a lower adjusting mechanism for the lamp. The lower adjusting mechanism is operated by an operating shaft formed of a pair of tubular sections 53, 54, universally connected together, as at 55. The section 54 extends through the openings 18 and 19 and abuts against one of the collars 28 carried by the partition 26. The inner end of the section 54 is provided with a pinion 56, which is keyed to said section 54 and meshes with the rack bar 39 for shifting the same when the operating shaft is revolved. The hub 57 of the pinion 56 is extended and abuts against a boss 58 formed on the inner face of the back wall 20 of the housing 10. The section 53 is disposed at an upward inclination with respect to the section 54, and said section 53 is of greater length than the section 54 and projects rearwardly from the instrument board 5 and also through a plate 59, which is secured to said board 5. The rear end of the section 53 has keyed therewith a manually operated actuating disk 60, which is arranged rearwardly of the plate 59. The disk 60 is provided with a knob 61 to facilitate the turning thereof. When the disk 60 is turned in either direction, the operating shaft will be actuated, causing thereby the lengthwise shifting of the rack bar 39, which, in connection with the pull rod 41 will shift the shaft 46 and adjust the position of the spot light 6. The adjusting of the spot light 6 will be had on a vertical axis and will be positioned to extend towards one or the other side of the road bed, depending in which direction the operating shaft is turned.

The upper adjusting device or mechanism for the lamp is actuated through the medium of an operating shaft formed of a pair of sections 62, 63, which extend through the sections 53 and 54 and are universally connected together, as at 64. The section 63 projects from the section 54 and through the openings 27 and collars 28 and carries on its inner end a worm pinion 65 which meshes with the worm gear 34. The hub 66 of the worm pinion 65 is extended to abut against the other collar 28 formed on the partition 26. The section 62 projects rearwardly from the section 63 and through the instrument board 5, plate 59 and disk 60 and has keyed to its rear end a manually operated adjusting disk 67, which is spaced from the disk 60 and is independent with respect to the latter. The disk 67 is provided with a knob 68 to facilitate the operation thereof. The disk 67 is of materially less diameter than the diameter of the disk 60. When the disk 67 is turned in either direction, the operating shaft for the upper adjusting device or mechanism for the lamp is actuated and, which in turn will carry the worm pinion 65 therewith, and the latter will provide for the operation of the worm gear 34, thereby operating the shaft 32, and which will shift the shaft 46 on a horizontal axis thereby carrying the spot light 6 therewith. After the spot light 6 has been adjusted on its vertical axis, then it can be adjusted on a horizontal axis so the spot light will direct the rays from the lamp downwardly or upwardly depending upon the position of the shaft 32. The lost motion connection between the crank arm 44 and the pull rod 41 will permit of the shifting of the shaft 46 by the shaft 32 and the slot 47 is of sufficient length to enable up and down movement of the spot light 6.

Carried by the plate 59 is a pair of spring controlled frictional latching devices 69 and 70. The former associated with the disk 60 to maintain it in set position, and the latter associates with the disk 67 to maintain it in set position.

The adjusting mechanism, in accordance with this invention, provides means for adjusting a spot light arranged at the forward end of a vehicle to the position desired, and with the mechanism including means whereby it can be operated from the interior of the vehicle. Further the mechanism includes means whereby the spot light will be detachably secured or maintained in the position to which it has been adjusted, and, therefore, it is thought the many advantages of a spot light adjusting mechanism, in accordance with this invention can be readily understood, and although the preferred embodiment of the invention is as illustrated and described, yet it is to be understood that changes in the details of construction can be had which will fall within the scope of the invention as claimed.

What I claim is:—

1. A shifting mechanism for a motor vehicle spot light comprising a housing adapted to be secured to and project laterally from the radiator frame of the vehicle, a spot light support arranged over said housing, a vertically disposed shaft arranged within and extended upwardly from said housing and connected to said support for adjusting the latter upon a horizontal and vertical axis, an upper adjusting mechanism positioned within said housing and including a vertically disposed sleeve for connecting the shaft therewith, said shaft having its lower end provided with a crank arm, a lower adjusting mechanism arranged within the housing and having a pin and slot connection with said crank arm, and means extending into the housing and operatively connected with said mechanisms and further projecting rearwardly from said housing to the interior of the vehicle and capable of being manually operated independently and in unison to provide for the independent operation of said adjusting mechanisms and to further provide for the operation of said adjusting mechanisms simultaneously.

2. A mechanism for the purpose set forth comprising a spot light support, a vertically disposed shaft having its upper end connected to said support and arranged to be revolved on a vertical axis and further arranged to be bodily tilted thereby providing means for the adjusting of the support upon a vertical and a horizontal axis, said shaft having its lower end formed with a crank arm and its upper portion reduced, a longitudinally extending shaft having its forward end provided with a vertically disposed sleeve for connecting the reduced portion of the vertical shaft therewith, said longitudinal shaft further provided with a gear wheel, a longitudinally extending rack bar, a pull rod having a pin and slot connection with said crank arm and further universally connected to said rack bar, operating means for said longitudinally extending shaft including a pinion meshing with said gear wheel, operating means for said rack bar including a pinion meshing with said bar, the said operating means projecting rearwardly and adapted to be operated from the interior of a vehicle, and means for operating the said operating means independently and in unison.

3. An adjusting mechanism for the spot light of a motor vehicle comprising a spot light support, a vertically disposed shaft revolvable on a vertical axis and tiltable on a horizontal axis, said shaft having its upper end connected to said support and its lower end provided with a crank arm, a longitudinally extending shaft provided at one end with a vertical sleeve for connecting the vertical shaft therewith and further provided intermediate its ends with a gear wheel, a pull bar having one end thereof connected with said crank arm by a pin and slot connection, a rack bar having one end thereof universally connected to the other end of said pull bar, supporting means for said longitudinal shaft and said rack bar, a universally jointed actuating element extending into said supporting means and provided with a pinion meshing with said bar, a universally jointed actuating element extending into said supporting means and provided with a pinion meshing with said gear wheel, said elements arranged one within the other, and means carried by said elements for operating them separately or in unison.

4. An adjusting mechanism for the spot light of a motor vehicle comprising a spot light support, a vertically disposed shaft revoluble on a vertical axis and further tiltable on a horizontal axis, said shaft having its upper end connected to said support and its lower end provided with a crank arm, a rock shaft provided with means at one end for loosely connecting said vertical shaft therewith and providing means for shifting the vertical shaft on a horizontal axis, means for shifting said vertical shaft on a vertical axis and formed of a pair of sections universally connected together, one of said sections provided with teeth, a pin and slot connection between the nontoothed section of said means and said crank arm, a support for said rock shaft and said means, an actuating element operatively connected with said rock shaft for shifting it, an actuating element having a gear connection with the toothed section of said means for shifting it, said elements arranged one within the other, and means for operating said elements independently or in unison.

In testimony whereof, I affix my signature hereto.

THOMAS DELMASTRO.